US012327453B2

(12) United States Patent
Trösch

(10) Patent No.: US 12,327,453 B2
(45) Date of Patent: Jun. 10, 2025

(54) ADDITIONAL ZONE MONITORING FOR A BUILDING DOOR

(71) Applicant: INVENTIO AG, Hergiswil (CH)

(72) Inventor: Florian Trösch, Erlenbach ZH (CH)

(73) Assignee: Inventio AG, Hergiswil (CH)

( * ) Notice: Subject to any disclaimer, the term of this patent is extended or adjusted under 35 U.S.C. 154(b) by 64 days.

(21) Appl. No.: 17/925,980

(22) PCT Filed: May 10, 2021

(86) PCT No.: PCT/EP2021/062317
§ 371 (c)(1),
(2) Date: Nov. 17, 2022

(87) PCT Pub. No.: WO2021/233719
PCT Pub. Date: Nov. 25, 2021

(65) Prior Publication Data
US 2023/0206710 A1 Jun. 29, 2023

(30) Foreign Application Priority Data
May 18, 2020 (EP) .................................... 20175221

(51) Int. Cl.
*G07C 9/15* (2020.01)
*E05F 15/73* (2015.01)
(Continued)

(52) U.S. Cl.
CPC ................ *G07C 9/15* (2020.01); *E05F 15/76* (2015.01); *G07C 9/00174* (2013.01); *G07C 9/25* (2020.01);
(Continued)

(58) Field of Classification Search
CPC ........ G07C 9/15; G07C 9/25; G07C 9/00174; E05F 15/76; E05F 2015/767; E05Y 2900/14
(Continued)

(56) References Cited

U.S. PATENT DOCUMENTS

2005/0093697 A1* 5/2005 Nichani .................. G07C 9/00 340/545.1
2007/0047837 A1* 3/2007 Schwab ................ G06T 7/0008 382/285
(Continued)

FOREIGN PATENT DOCUMENTS

EP 2395451 A1 12/2011
WO WO 2010/112586 A1 10/2010
WO WO 2018/069341 4/2018

OTHER PUBLICATIONS

International Search Report for International Application No. PCT/EP2021/062317 dated Jul. 16, 2021.

*Primary Examiner* — Kam Wan Ma
(74) *Attorney, Agent, or Firm* — Knobbe, Martens, Olson & Bear, LLP

(57) ABSTRACT

A system for controlling access to a building or a restricted zone in the building includes a building door system having a building door, an electronic locking device, and a recognition device for capturing credentials for an object. If the credentials are valid, the building door can be unlocked and can be brought from a closed position into an open position. A sensor system monitors an access zone that includes a specified access region to the building door, in order to detect a person who is in the access zone. A control device generates an alarm signal when the building door system grants access and the sensor system detects a person in the
(Continued)

access zone, wherein the building door system disables access upon receipt of the alarm signal.

13 Claims, 2 Drawing Sheets

(51) Int. Cl.
*E05F 15/76* (2015.01)
*G07C 9/00* (2020.01)
*G07C 9/25* (2020.01)

(52) U.S. Cl.
CPC ..... *E05F 2015/767* (2015.01); *E05Y 2900/14* (2013.01)

(58) Field of Classification Search
USPC ........................................................... 340/5.2
See application file for complete search history.

(56) References Cited

U.S. PATENT DOCUMENTS

2017/0221289 A1 8/2017 Trani
2019/0172284 A1 * 6/2019 Herget ..................... B25J 5/007
2020/0217121 A1 * 7/2020 Paulsson ................. E05F 15/70

* cited by examiner

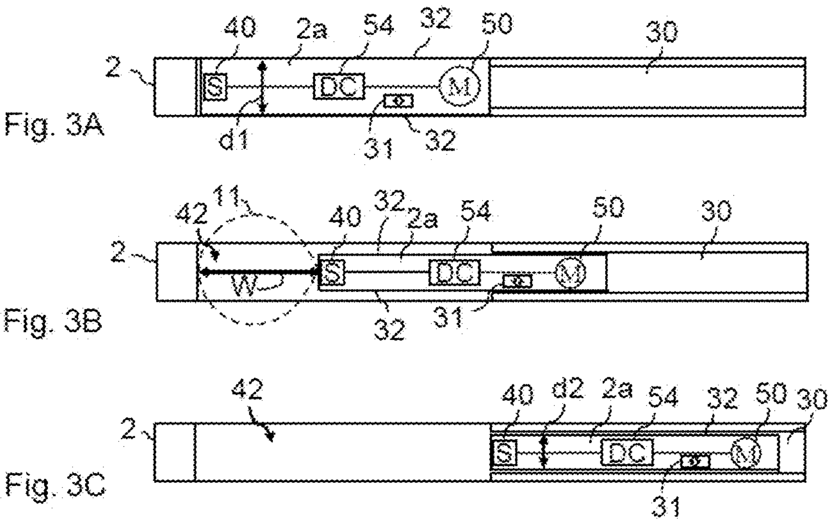
Fig. 3A
Fig. 3B
Fig. 3C
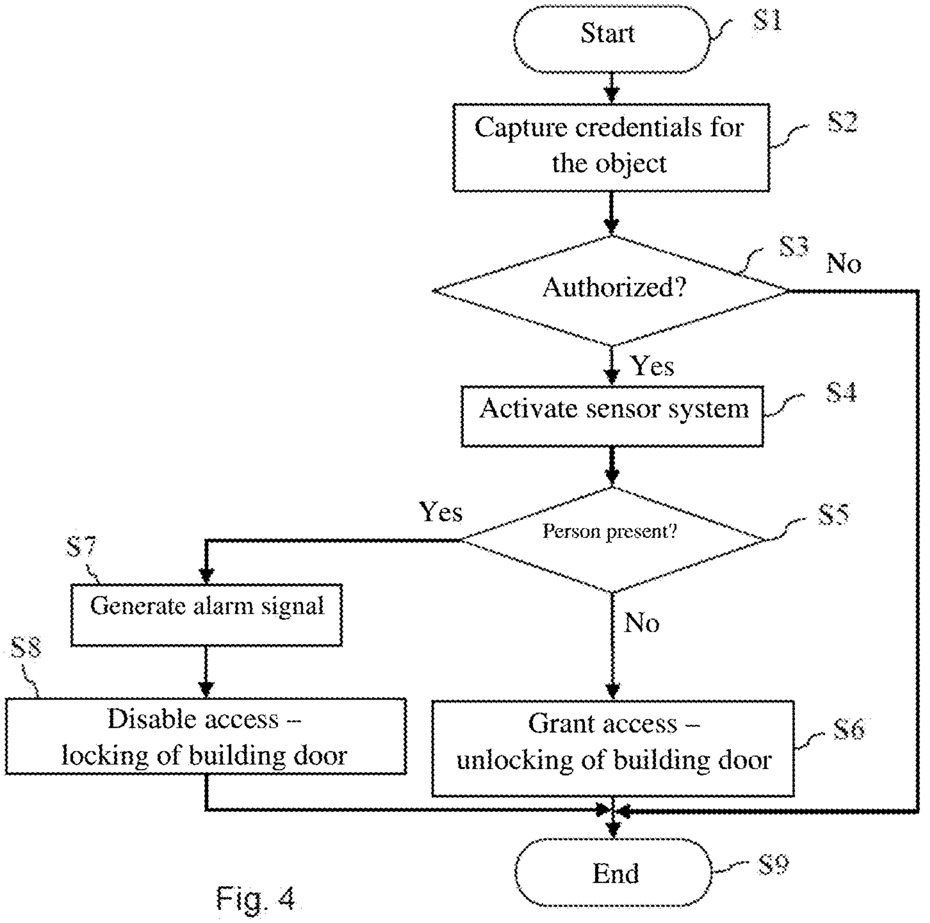
Fig. 4

ADDITIONAL ZONE MONITORING FOR A BUILDING DOOR

TECHNICAL FIELD

The technology described herein relates generally to an access control system for a building. Embodiments of the technology also relate to a method for operating the access control system.

SUMMARY

Access control systems can be configured in the most varied of ways in order to grant or deny persons access to a restricted zone. The configuration may relate, for example, to the way in which persons (users) must identify themselves as having access authorization, e.g., using a key, a magnetic card, a chip card, or an RFID card, or using a mobile electronic device (e.g., mobile phone). WO 2010/112586 A1 describes an access control system in which a user having access authorization is shown an access code on a display on a mobile phone that the user carries. If the user holds the mobile phone up to a camera such that said camera can capture the displayed access code, the access control system grants the user access if the access code is valid.

The configuration of an access control system can also relate to the way in which access is granted or denied to persons, for example, through doors, locks, or barriers. It is known, for example, that an electronic lock is arranged on a door, at which lock an access code must be entered so that the door can be unlocked and opened. In addition to this unlocking function on a door, it is known to monitor passage through the door. WO 2018/069341 A1 describes, for example, an apparatus that uses sensors to monitor whether and what objects are moving through a door. To monitor objects by means of infrared image recording and infrared pulse lighting, the apparatus has a stereometric object recognition device which consists of a radiation source and an image recording device and which is fastened in a stationary manner near a wall or a door frame. The object recognition device determines the geometric dimensions of an object (person, car) in order to determine how far the door needs to be opened for the object to pass through. The aim is to ensure the comfort and safety of the object passing through; for example, a person walking or driving should feel safe when passing through the door.

The systems mentioned relate to different requirements of access control and related configurations of access control systems. In addition to these known requirements, there are further requirements, for example, due to changing lifestyles or living conditions (e.g., dense living in apartments in a city), including a need for increased security and increasing automation of and in buildings. There is therefore a need for technology for an access control system that meets these requirements, with the access control having to take into account, in particular, the need for security without negatively affecting the comfort for users.

One aspect of such technology relates to a system for controlling access to a building and/or a restricted zone within the building. The system comprises a building door system having a building door, an electronic locking device, and a recognition device for capturing credentials for an object. If the credentials are valid, the building door can be unlocked by the electronic locking device and can be brought from a closed position into an open position in order to grant the object access at the building door. The system also comprises a sensor system configured to monitor an access zone that comprises a specified access region to the building door, and to detect a person who is in the access zone. A control device of the system is communicatively connected to the building door system and the sensor system. The control device is configured to generate an alarm signal when the building door system grants access to the object and the sensor system detects a person in the access zone, wherein the building door system disables access upon receipt of the alarm signal.

Another aspect of the technology relates to a method for operating a system for controlling access to a building and/or a restricted zone in the building. The system comprises a building door system that has a building door, an electronic locking device, and a recognition device for capturing credentials for an object, a sensor system for monitoring an access zone that comprises a specified access region to the building door, and a control device that is communicatively connected to the building door system and the sensor system. According to the method, credentials for the object are captured using the recognition device while the object is located in an access zone of the building door. If the credentials are valid, the building door can be unlocked and brought from a closed position into an open position in order to grant the object access at the building door. The sensor system detects whether there is a person in the access zone. An alarm signal is generated by the control device when the building door system grants access to the object at the building door and the sensor system detects a person in the access zone. Upon receipt of the alarm signal by the building door system, access at the building door is disabled by means of the building door system.

The technology described herein creates an access control system that offers additional security, in particular when the object requests access at a building door autonomously and without the accompaniment of an associated person. The object can be an autonomously driving object (hereinafter referred to as a robot) or a pet (e.g., a dog or a cat). According to the technology described herein, access is only granted to the object if the access zone of the building door is secure. In one embodiment, the access zone is secure when the object is alone in the access zone. If, on the other hand, a person "unauthorized" for the building door is located in the access zone who does not belong to the object, for example, does not accompany it, the access zone is not considered secure according to the technology described herein. In this case, access is disabled, for example, to prevent unauthorized entry by the person.

Disabling access can take place in different ways and, in particular, can be flexibly adapted to the relevant situation. In one embodiment, disabling access may comprise blocking the building door in the closed position. In this case, the unauthorized person is detected before the building door is opened for the object. The opening of the building door can then be delayed, for example, until the unauthorized person has left the access zone and said zone is then considered secure again. Depending on the configuration of the system, the object can then present the credentials again.

In one embodiment, disabling access may comprise blocking the building door in a partially open position. In this case, the unauthorized person is detected when the building door is already unlocked and partially opened for the object. The building door can then be blocked so that it cannot be opened any further. This is particularly advantageous when the building door is only open a crack that is too narrow for a person. In one embodiment, opening the building door can be delayed until the unauthorized person has left the access zone and said zone is then considered secure again.

In one embodiment, disabling access may comprise closing the building door from a fully or partially open position; the fully open position is specified for the object in one embodiment. For example, the building door can only be opened for the object (e.g., a robot or a pet) far enough for the object to fit through; this width represents the fully open position in this situation. Starting from this fully or partially open position, the building door can be caused to close. If the object is not yet located in the passage region, the building door can be closed again. If, on the other hand, the object is already located in the passage region, the building door can be closed, for example, until it touches the object.

In embodiments of the technology described herein, the object may gain access at the building door without being accompanied by an authorized person and without an authorized person being in the restricted zone. The technology described herein offers the mentioned additional security for such a situation because the risk of an unauthorized person gaining access through the building door opened for the object is reduced.

In one embodiment, the technology uses a recognition device that is arranged on the building door system or in the vicinity thereof and is communicatively connected to the control device. The building door system can thus be adapted to the relevant building situation. In one embodiment, the building door system comprises a sliding door; the recognition device can be arranged on the sliding door, as a result of which the amount of cabling can be reduced.

The recognition device is configured to capture credentials presented by the object. It is advantageous here that the type of credentials and, accordingly, the configuration of the recognition device can be selected depending on the requirements in the building. The recognition device can, for example, comprise a transceiver for radio signals, a capturing device for a biometric feature, a capturing device for an optical code, a reader for a magnetic stripe card or a chip card, and/or a keypad or a touch-sensitive screen for manually entering a password. In one embodiment, the recognition device can have a transceiver for radio signals and a capturing device (e.g., a digital camera) for an optical code. The type of optical code (e.g., bar code, QR code, and color code) can also be selected.

In one embodiment, the sensor system comprises a camera and is configured to evaluate an image recorded by the camera in order to detect a person who is in the access zone. There is flexibility regarding the type of camera. The camera can be a 2D camera or a 3D camera, for example. For example, a time-of-flight camera can be selected as the 3D camera.

The technology described herein also has an advantage that its use is not restricted to a specific type of building door system. In one embodiment, the building door system can comprise a sliding door that is installed in the building to save space. A wall shell region of a door frame, for example, at least partially accommodates the sliding door in the open position. The door frame also has a passage region. The sliding door has an end face which points toward the passage region in the open position. In one embodiment, the sliding door has an actuator which is configured to position door leaves in a first position with a first leaf spacing when the sliding door is in the closed position and in a second position with a second leaf spacing when the sliding door is in the open position. The first leaf spacing is greater than the second leaf spacing. Such a building door system is particularly suitable for the objects described herein (in particular for a robot), since said objects and the building door system do not have to take a door leaf pivoting range into account. The closing process of the sliding door can be initiated, for example, as soon as the object leaves a track of the sliding door, e.g., is located outside the passage region.

In one embodiment, the sliding door system has an interface device which is arranged on the building door and is configured to transmit data to and/or receive data from a building management system. The building management system can be arranged in the building or at a distance therefrom.

Credentials make it possible to check the access authorization of the object. In one embodiment, if the credentials are valid for the object, the control device determines a data record in a storage device, in which data record the credentials are assigned to an access authorization. The data record can be managed by a person responsible for the restricted zone (tenant, owner, building manager, etc.). In one embodiment, the credentials are also assigned to an opening width of the building door. The opening width is optimized for the object.

BRIEF DESCRIPTION OF THE DRAWINGS

Various aspects of the improved technology are described in greater detail below with reference to embodiments in connection with the drawings. In the drawings, identical elements have identical reference signs. In the drawings:

FIG. 3A is a schematic illustration of an example of a sliding door system with a closed sliding door;

FIG. 3B is a schematic illustration of the sliding door system from FIG. 3A, with the sliding door being in an intermediate position;

FIG. 3C is a schematic illustration of the sliding door system from FIG. 3A, with the sliding door being in an open position; and FIG. 4 is a flowchart of an embodiment of a method for operating an access control system.

DETAILED DESCRIPTION

Figure 1:
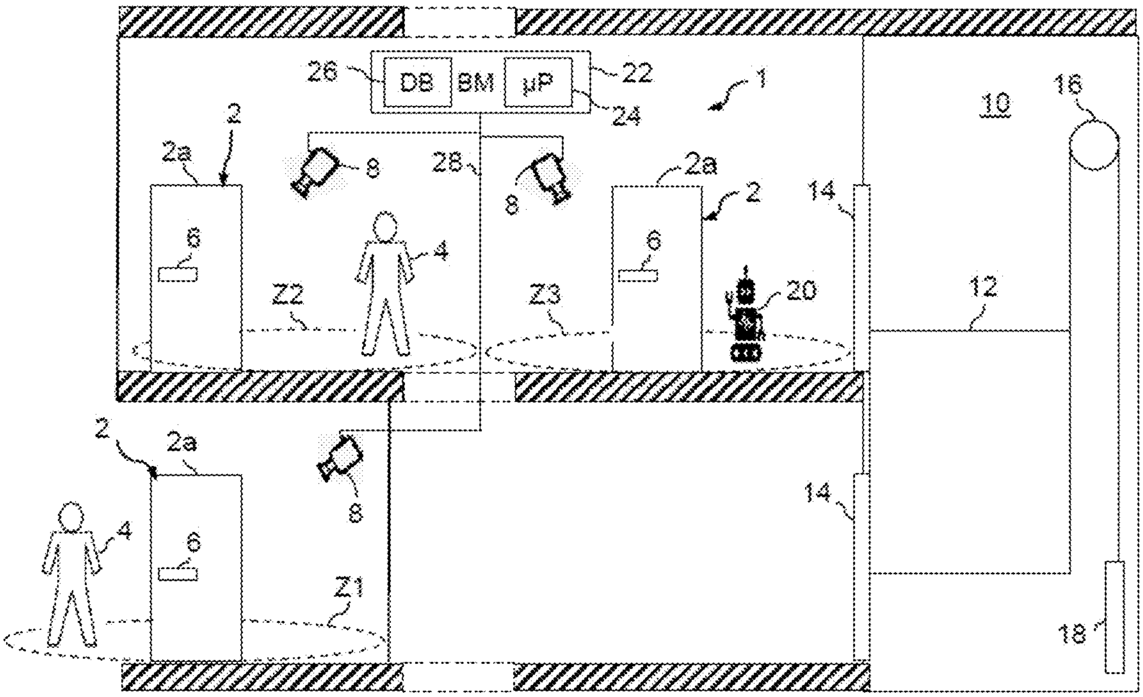
FIG. 1 is a schematic illustration of an example of a situation in a building having an access control system according to one embodiment.

FIG. 1 is a schematic illustration of an example of a situation in an example of a building having an access control system 1 and one or more floors L0, L1. In this description, the term "building" is to be understood as meaning, for example, residential and/or commercial buildings, hotels, hospitals, and other buildings in which persons can stay. If a plurality of floors is present in a building, said floors can be served by an elevator system 10 in a known manner. For illustration, the elevator system 10 in FIG. 1 is indicated with an elevator car 12, elevator doors 14, a drive device 16, and a counterweight 18.

In the embodiment shown, the building has a ground floor L0 and an upper floor L1, which can be used by persons 4 or objects 20. For illustration, FIG. 1 shows a person 4 outside the building in front of a front door (2) and a person 4 and an object 20 (e.g., an autonomous robot) on the floor L1. A person 4 or the object 20 can, for example, be authorized to enter the building and one or more rooms in the building; a building door system 2 provided for this purpose can block a building door 2*a* for a person 4 or an object 20 or release it for them if access authorization exists. However, the person 4 or the object 20 may not have access authorization to other rooms; the corresponding building doors 2 remain locked for them.

FIG. 1 shows, on the upper floor L1, two building doors 2*a* serving as interior building doors, through which, for example, persons 4 or objects 20 can enter and exit restricted access regions or rooms 36 (see FIG. 2) located behind said doors. The building and/or individual restricted regions or rooms can be managed by a responsible person (e.g., tenant, owner, building management, etc.); the person responsible for this can issue access authorizations. A person skilled in the art would recognize that the building on the ground floor L0 may also have one or more building doors 2*a*, for example, another front door and/or one or more interior building doors. There may be a single building door 2*a* or more than two building doors 2*a* on the upper floor L1. The latter can be the case, for example, in an office building or in a residential building in which individual offices or apartments can be entered from a common corridor.

Each of the building doors 2*a* shown in FIG. 1 has an electrically controllable locking device 50 (see FIG. 2) by means of which a building door 2*a* can be locked and unlocked. In one embodiment, the locking device 50 can be controlled by an electrical control signal. If the building door 2*a* can be opened for a person 4 or an object 20, the electrical control signal activates the locking device 50, as a result of which the building door 2*a* is unlocked. Correspondingly, in one embodiment, the locking device 50 can be activated by an electrical control signal in order to lock the building door 2*a*. An embodiment of a locking device 50 is specified elsewhere in this description.

FIG. 1 also shows a building management system 22 (BM), a communication network 28, and a sensor system 8. The communication network 28 extends (horizontally) on the floors L0, L1 and (vertically) between the floors L0, L1 and connects the sensor system 8 to the building management system 22. The sensor system 8 comprises a plurality of individual systems, which are shown as cameras in FIG. 1 (in the following, the reference sign 8 can also refer to a camera). The sensor system 8 monitors specified zones or regions in the building and, depending on the building and requirements, also outside the building. According to the technology described herein, the sensor system 8 monitors in particular access zones Z1, Z2, Z3, shown as examples in FIG. 1, in the region of the building doors 2*a*. A person skilled in the art would recognize that the access zones Z1, Z2, Z3 can overlap and that, for example, only a single access zone Z1, Z2, Z3 is specified on a floor L0, L1; this can extend, for example, over the entire region in front of the building door or doors 2*a* on the floor L0, L1. A person skilled in the art would also recognize that the sensor system 8 can be adapted to the building (e.g., with regard to its size, location, and type of use) and that, for example, corridors, hallways, parking levels, garages, and stairwells can also be monitored. The number of cameras 8 and their positioning in the building can be selected accordingly.

In the embodiment shown, one aspect of the building management system 22 relates to controlling and monitoring access to the building and to the individual regions and rooms within the building. This aspect can be implemented for the building in one embodiment by a control device (μP) 24 in conjunction with the building door system 2, the sensor system 8, and a storage device 26 in which a database is stored; these components are part of an access control system 1 to which reference is made in the following description.

In the situation shown in FIG. 1, the technology described herein can be used in an advantageous manner in order to operate the access control system 1 with the highest possible degree of security. Summarized briefly and by way of example, the access control system 1 has the building door system 2, the sensor system 8, and the control device 24. The building door system 2 comprises one or more building doors 2*a*, each having an electronic locking device 50 and a recognition device 6 for capturing credentials for the person 4 or the object 20, wherein, if the credentials are valid, the building door 2*a* can be unlocked by the electronic locking device 50 and can be brought from a closed position into an open position in order to grant the person 4 or the object 20 access to the restricted zone 36. The sensor system 8 is configured to monitor an access zone Z1, Z2, Z3 that comprises a specified access region to the building door 2*a*, and to detect a person 4 who is in the access zone Z1, Z2, Z3. The control device 24 is communicatively connected to the building door system 2 and the sensor system 8 and is configured to generate an alarm signal when the building door system 2 grants the object 20 access and the sensor system 8 detects a person 4 in the access zone Z1, Z2, Z3. Upon receipt of the alarm signal by the building door system 2, the building door system 2 disables access.

The technology thus uses the sensor system 8 to recognize, for example, the object 20 (shown in FIG. 1) in the zone Z3 coming from the elevator door 14 toward the building door 2*a* in the zone Z3. The object 20 can be, for example, a robot or a pet (e.g., a dog or a cat). In the following description, the object 20 is a robot which wants to move into the room behind this building door 2*a* (e.g., restricted zone 36 in FIG. 2) in order to, for example, fulfill an order (e.g., make a delivery or clean the floor). The above-mentioned responsible person who is responsible for this room can, for example, grant the object 20 access authorization for the building and/or the room when the order is placed. The access authorization is stored in conjunction with associated credentials (e.g., an access code) in the building management system 22, in particular in the storage device 26.

If the object 20 is then located at the building door 2*a* and presents proof of a valid access authorization (credentials), the building door 2*a* can be unlocked. Before the building door 2*a* is opened, the access control system 1 uses the sensor system 8 to check whether the access zone Z3 is "secure." If there is no person 4 in the access zone Z3, e.g., the object 20 is located alone in front of the building door 2*a*, the access zone Z3 is secure and the building door 2*a* can be opened in response to a control signal to allow the object 20 access. If, on the other hand, the access zone Z3 is not secure because, in addition to the object 20, there is also a person 4 (e.g., without access authorization to the building door 2*a*) in the access zone Z3, the control device 24 generates an alarm signal; the alarm signal is generated when the building door system 2 grants access to the object 20 and the sensor system 8 detects the person 4 in the access zone Z3 substantially at the same time. Access can then be disabled; for example, it can be interrupted until the access zone Z3 is secure again. During this interruption, the building door 2*a* is locked and closed. Alternatively, if the process is already in progress, it can be aborted; the building door 2*a* is in the locked and/or closed state. In one embodiment, after a specified waiting time, the object 20 may re-present the credentials; the process mentioned is then repeated, possibly until the access zone Z3 is secure. The technology thus reduces the risk that an unauthorized person can enter the room through the building door 2*a* that is open for the robot.

According to the technology described herein, the sensor system 8 is used to detect persons 4 who are in the access zones Z1, Z2, Z3. In one embodiment, the sensor system 8 can comprise optical sensors in the visible or infrared optical spectrum in conjunction with an evaluation device. In another embodiment, the sensor system 8 can comprise sensors that are based on a different physical principle, for example, ultrasonic sensors or radar sensors. In one embodiment, the evaluation of sensor signals makes it possible to determine the location of the person 4, their speed of movement, and velocity. In the following description, the sensor system 8 has cameras as optical sensors in conjunction with an evaluation device for digital image recordings. Such a camera can, for example, be a 2D or 3D camera, the modes of operation of which are known to a person skilled in the art, and so only the mode of operation of a 3D camera is summarized herein.

A camera based on the principle of time-of-flight measurement (TOF sensor) can be used as the 3D camera. The 3D camera comprises a light-emitting diode unit or laser diode unit which, for example, emits light in the infrared range, the light being emitted in short pulses (e.g., several tens of nanoseconds). The 3D camera also comprises a sensor group consisting of a number of light-sensitive elements. The sensor group is connected to a processing chip (e.g., a CMOS sensor chip), which determines the time of flight of the emitted light. The processing chip simultaneously measures the distance to a number of target points in space in a few milliseconds. The 3D camera can also be based on a measuring principle according to which the time of flight of emitted light over the phase of the light is captured. The phase position when the light is transmitted and when it is received is compared and the time elapsed or the distance to the reflecting object is determined therefrom. For this purpose, a modulated light signal is preferably emitted instead of short light pulses. Further details on measurement principles are given, for example, in the following publications: "Fast Range Imaging by CMOS Sensor Array Through Multiple Double Short Time Integration (MDSI)," P. Mengel et al., Siemens AG, Corporate Technology Department, Munich, Germany, and "A CMOS Photosensor Array for 3D Imaging Using Pulsed Laser," R. R. Jeremias et al., 2001 IEEE International Solid-State Circuits Conference, p. 252.

The control device 24 of the access control system 1 is connected to the recognition device 6. The recognition device 6 is generally configured to capture credentials on the basis of which the access control system 1 can determine the access authorization of the person 4 or the object 20. The credentials can, for example, be in the form of a physical key, a manually input password (e.g., a PIN code), a biometric feature (e.g., fingerprint, iris pattern, speech/voice characteristics or facial features) or an access code captured from a magnetic card, chip card or RFID card or from an electronic device (using NFC, Bluetooth or a cellular network). The credentials must be presented when access to the restricted zone 36 is desired.

Corresponding to the mentioned forms which the credentials can take, the credentials can be presented in different ways, for example, by a conscious manual action (e.g., entering a PIN code or holding out an RFID card) or by approaching the door to come within radio range of the recognition device 6 (e.g., to establish an RFID or Bluetooth connection). The recognition device 6 can be arranged on the building door 2*a* or in the vicinity thereof, for example, it can be arranged on an outside of the building door 2*a* so that it can capture the credentials when the person or the object 20 is in front of the building door 2*a*.

The recognition device 6 is configured according to the credentials provided in the access control system 1. This means that the recognition device 6 has, for example, a door cylinder, a capturing device for a biometric feature, a capturing device for an optical code (e.g., bar code, QR code, and color code (see WO2015049186 A1), a reader for a magnetic stripe card or a chip card, a keypad or a touch-sensitive screen for manually entering a password, or a transceiver for radio signals. A person skilled in the art would recognize that, in one embodiment, the recognition device 6 may be configured for one or more of these credentials. In one embodiment, the recognition device 6 can comprise, for example, a transceiver for radio signals and a digital camera for capturing an optical code or a face. The optical code can be visibly printed on a carrier material or displayed on a display of a mobile phone. In the situation shown in FIG. 1, the object 20 requests access and presents credentials at the building door 2*a* in the access zone Z3; the person 4 does not have access authorization there. The recognition device 6 for recognizing credentials suitable for the object 20 is configured on this building door 2*a*. In one embodiment, the credentials are transmitted from the object 20 to the recognition device 6 by radio, in particular using Bluetooth technology.

A person skilled in the art would recognize that the building management system 22 can be entirely or partially outsourced to an IT infrastructure for cloud computing (also known as the "cloud" in colloquial terms). This includes, for example, storing data in a remote data center, but also executing programs that are not installed locally but rather remotely. Depending on the configuration, a certain functionality can be made available, for example, in the control device 24 or via the "cloud." For this purpose, a software application or program parts thereof can be executed in the "cloud," for example. The control device 24 then accesses this infrastructure as required in order to execute the software application.

Figure 2:
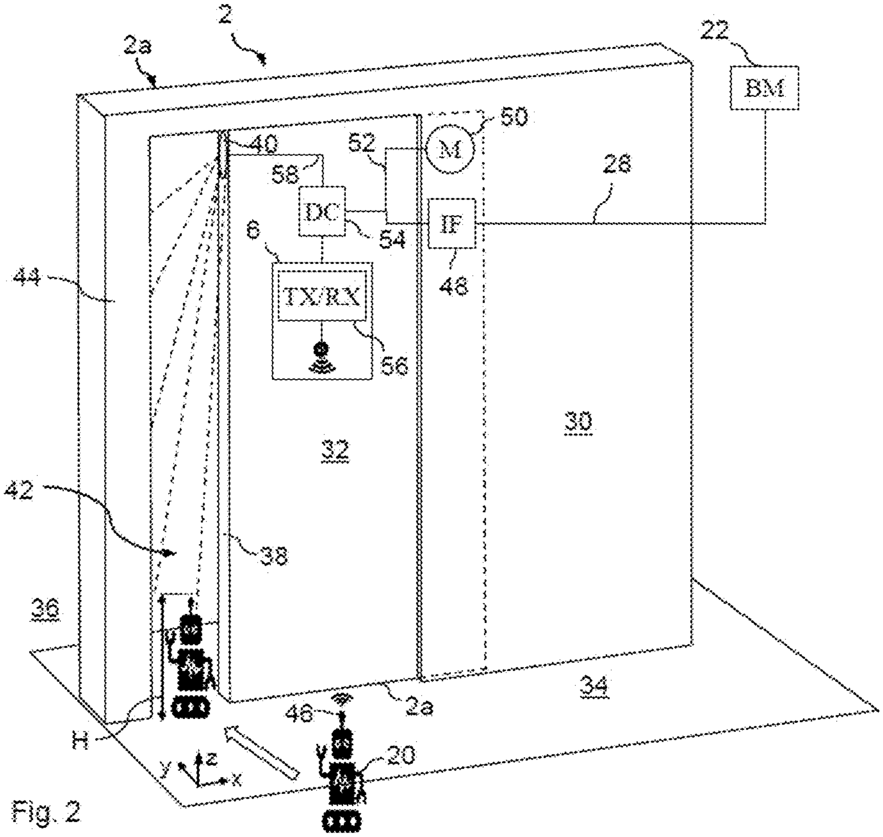
FIG. 2 is a schematic illustration of an example of a sliding door system as an embodiment of a building door system.

FIG. 2 shows a schematic illustration of an example of a building door system 2 in the form of a sliding door system (correspondingly, the building door system 2 is also referred to below as sliding door system 2, which has a sliding door 2*a*). The sliding door system 2 is inserted into a building wall and represents a physical barrier between a public zone 34 and the restricted zone 36. In relation to the x-y-z coordinate system drawn in FIG. 2, the building wall extends in a plane that is spanned by the x and z axes. The restricted zone 36 may be, for example, an apartment, an office, or another space in the building. The sliding door system 2 can be inserted into a building internal wall (for access control within the building, e.g., access to an apartment) or in a building external wall (for controlling access to the building). As explained in more detail elsewhere in this description, the sliding door system 2 opens a sliding door 2*a* for the object 20 having access authorization.

The sliding door system 2 shown in FIG. 2 comprises a door frame 44 and the sliding door 2*a*. The door frame 44 has a passage region 42 and a wall shell region 30 which is configured to at least partially accommodate the sliding door 2*a*. For this purpose, the wall shell region 30 has a structure which forms a cavity that is dimensioned so as to accommodate the sliding door 2*a*. The passage region 42 is the region in the building wall in which it is possible to pass through from one zone (34, 36) to the other zone (34, 36) in the direction of the y-axis; the passage is between a vertical frame part (door post) and the opposite wall shell region 30. Depending on the configuration, the wall shell region 30 is accommodated in a cavity in the building wall, or the wall shell region 30 can be regarded as part of the building wall, possibly in the manner of cladding.

The sliding door 2*a* is slidable in the door frame 44 between a closed position shown in FIG. 3A and an open position shown in FIG. 3C. In relation to the x-y-z coordinate system drawn in FIG. 2, the sliding door 2*a* is slid along the x-axis. In the open position, the sliding door 2*a* is located substantially within the wall shell region 30 in one embodiment. Between these maximum positions, the sliding door 2*a* can assume an intermediate position shown in FIG. 2, in which the sliding door 2*a* (and correspondingly the passage region 42) is open to a lesser or greater extent, e.g., an end face 38 of the sliding door 2*a* has a variable distance from the frame part 2*a*. This variable distance is shown as the opening width W in FIG. 3B.

The sliding door 2*a* has two substantially parallel door leaves 32 (on an inner side and an outer side of the sliding door 2*a*, respectively). The door leaves 32 are spaced apart from one another (in the y-direction) such that there is an inner space between the door leaves 32 in which system components and insulating material for soundproofing and fire protection can be arranged. The door leaves 32 are connected to one another in the region of the end face 38, as shown for example, in FIG. 3*a*. Each of the door leaves 32 extends in parallel with the x-z plane. Further details of the sliding door 2*a* are disclosed elsewhere in this description.

FIG. 2 also shows a processor unit (DC) 54, an embodiment of the recognition device 6, an interface device 48, and an embodiment of the locking device 50 (M), which are components of the sliding door system 2 in one embodiment. In one embodiment, the sliding door system 2 is connected to the building management system 22 (BM); in the embodiment shown in FIG. 2, this connection is established by means of the communication network 28 to which the building management system 22 and the interface device 48 are coupled. Depending on the configuration, a specific functionality can be made available, for example, in the processor unit 54, in the building management system 22, or via the "cloud." The processor unit 54 or the building management system 22 accesses this infrastructure when required to execute a desired software application.

The communication network 28 can comprise an electronic bus system in an execution system. In one embodiment, the electrical connection of the sliding door system 2, including its supply with electrical energy, is established via the interface device 48. A person skilled in the art would recognize that a plurality of sliding door systems 2 can be provided in the building and that each of these sliding door systems 2 is coupled to the communication network 28 in order to communicate with the building management system 22, for example, in conjunction with determining and checking access authorizations, if this is carried out centrally by the building management system 22.

The processor unit 54 is connected to a sensor unit 40 by an electrical connection 58. The processor unit 54 is also connected to the locking device 50 and to the interface device 48 by means of an electrical connection 52. The electrical connections 52, 58 are configured for signal and/or energy transmission; for this purpose, they can each comprise individual electrical lines or an electrical bus system.

The processor unit 54 is also connected to the recognition device 6. In the embodiment shown in FIG. 2, the recognition device 6 captures credentials, which a radio device 46 of the object 20 or a radio device carried by the object 20 transmits as a radio signal. The radio signal can be transmitted in accordance with a known standard for radio communication (e.g., RFID, WLAN/WiFi, NFC, Bluetooth). Accordingly, the recognition device 6 is configured to receive such a radio signal; for this purpose, a transceiver 56 and an antenna connected thereto are shown in FIG. 2.

The transceiver 56, alone or in conjunction with the processor unit 54 and/or the control device 24 and the stored database (26), determines the credentials from the received radio signal, which are then used to determine the access authorization. If the credentials are valid, the object 20 is granted access; in this case, the processor unit 54 controls the locking device 50, which moves the sliding door 2*a* toward the open position. If the credentials are not valid, the sliding door 2*a* remains closed and locked.

The sensor unit 40 is arranged on the end face of the sliding door 2*a*, for example, in a region of an upper (corner) edge of the sliding door 2*a*. From this elevated region, the sensor unit 40 has an optimized detection field in the direction of the passage region 42 and the floor. An example of a detection field is shown in FIG. 2 (vertical) and in FIG. 3B (horizontal). In addition, the sensor unit 40 is better protected in this region from dirt and damage (e.g., from vandalism). A person skilled in the art would recognize that the sensor unit 40 can be arranged at a different location on the sliding door 2*a* in another embodiment; the sensor unit 40 can also be arranged on the door frame 44.

According to the technology described herein, a (vertical) height of the object 20 is determined using the sensor unit 40. In the present description, the term "height" is used for the extent of the object 20 in the direction of the z-axis; however, the object 20 according to the technology described herein can also be a person (for persons, their size is usually specified). The height of the object 20 (person, animal, or robot) indicates a distance between the floor and a topmost point or region of the object 20. At the instant of determination (measurement instant), the object 20 is located on the floor, substantially in the passage region 42. The sensor unit 40 has a fixed and known distance from the floor (floor distance). In this situation, according to one embodiment, an object distance between the sensor unit 40 and the object 20 is determined. The height H of the object 20 results from a difference between the floor distance and the object distance.

In one embodiment, the sensor unit 40 comprises a 3D camera. The functioning of a 3D camera is described elsewhere in this description in connection with the sensor system 8.

The components mentioned (processor unit 54, recognition device 6, interface device 48, locking device 50) are arranged on the sliding door 2*a* and move along with the sliding door 2*a*. In one embodiment, the processor unit 54 is arranged in a region between the door leaves 32, for example, in the region of a rear face of the sliding door 2*a* opposite the end face. In one embodiment, the rear side of the sliding door 2*a* is not visible from the outside because the sliding door 2*a* can be wider than the passage region 42 and the rear face therefore remains in the wall shell region 30 when the sliding door 2*a* is in the closed position. The locking device 50 and the interface device 48 can also be arranged in said region. The electrical connections 52, 58 are accordingly arranged between the door leaves 32 and are not visible from the outside. However, the technology described herein is not restricted to this arrangement of the components, which is mentioned by way of example.

The storage device 26 is electrically connected to the control device 24. In the embodiment shown, the storage device 26 has a storage region for a database (DB) and a storage region for one or more computer programs (SW) for operating the sliding door system 2. In one embodiment, the operation of the sliding door system 2 comprises opening the sliding door 2*a* on the basis of the recognized object 20 and determining a height H of the object 20. The computer program can be executed by the control device 24.

The database stores a data record for the persons and the object 20 authorized to enter the restricted zone 36. The stored data record is also referred to below as a user profile. The user profile comprises data, e.g., name, information relating to credentials (key number, PIN code, access code, including biometric data) and any time restrictions for access (e.g., access from Monday to Friday, from 7:00 am to 8:00 pm). If a plurality of persons and objects are authorized to enter the restricted zone 36, the database stores a user profile for each person and object.

According to the technology described herein, each user profile also specifies the opening width W (see FIG. 3B) up to which the sliding door 2*a* is to be opened and what height H the object 20 has. The height H of the object 20 can be a maximum height or a height range because, for example, a cat can walk through the passage region 42 with its head lowered or raised and/or its tail raised. In one embodiment, the length (in the y direction) of each object 20 can also be specified. The height H and the length (if present) are plausibility parameters, as explained elsewhere in this description.

These data can be organized in a table, as shown in the following table. The table shows four user profiles for four authorized objects or persons (human, cat, dog, robot). Each authorized object or person is assigned an identifier (ID) which is linked to the width W and the height H. For example, if the recognition device 6 recognizes the identifier ID=78, then user profile no. 4 for a robot is accessed. In this case, the sliding door 2*a* is opened approx. 50 cm and the height determined using the sensor unit 40 is compared with the height H=50 stored for the robot. The determined height must lie in a height range that matches the stored height of the robot, e.g., it must be plausible that it is actually the robot. Instead of a specific height H, in one embodiment, a height range can be specified in the table for one or more (all) authorized objects or persons. A person skilled in the art would recognize that the values given in the table are examples and can differ from real situations.

| User profile no. | Object | ID | W (cm) | H (cm) |
|---|---|---|---|---|
| 1 | Name | 12 | 70 | 185 |
| 2 | Cat | 34 | 12 | 30 |
| 3 | Dog | 56 | 25 | 50 |
| 4 | Robot | 78 | 50 | 50 |

With the aforementioned plausibility check, it can be recognized that if a height H of 180 cm is determined for a pet, for example, instead of an expected height H of 50 cm, then not only the pet but also a person is passing through the opened sliding door 2*a*. It could also be the case, for example, that an unauthorized person removes a pet's credentials (e.g., RFID tag) in order to try to gain access in its place. Similarly, an expected height H of 170 cm does not match a determined height H of 100 cm. For example, this may happen if a child is using a parent's credentials. Although the child is an authorized person, the parents potentially may not want the child to use the credentials under certain circumstances.

With an understanding of the basic system components described above and their functions, an example of a method for operating the access control system 1 based on the situations shown in FIG. 1 and FIG. 2 is described below in connection with FIG. 4. The following is described with reference to the object 20 (robot) which, coming from the public zone 34 (FIG. 2), moves toward the sliding door 2*a* in order to enter the restricted zone 36. The object 20 is located in the access zone Z3 shown in FIG. 1. The radio device 46 of the object 20 uses Bluetooth technology, for example, and is activated. The method shown in FIG. 4 begins with a step S1 and ends with a step S9. A person skilled in the art would recognize that the division into these steps is by way of example and that one or more of these steps may be divided into one or more sub-steps or that a plurality of the steps may be combined into one step.

In a step S2, the recognition device 6 captures credentials for the object 20 that is located in the access zone Z3 in front of the sliding door 2*a*. The credentials are available, for example, as an access code that is transmitted using the radio device (e.g., via Bluetooth technology). In a step S3, the control device 24 checks whether a user profile has been created in the database in the storage device 26 for the credentials. If this check shows that the object 20 has access authorization, the method proceeds along the "yes" branch to a step S4. If, on the other hand, the object 20 does not have access authorization, the method proceeds along the "no" branch to the step S9 and ends there; the building door 2*a* remains locked and closed.

In the step S4, the sensor system 8 is activated, in particular to generate and evaluate image recordings. A person skilled in the art would recognize that the sensor system 8 can already be activated according to another embodiment. In this case, the step S4 can possibly be omitted. The sensor system 8 can be continuously activated for general monitoring purposes, for example, and can continuously evaluate image recordings. In another embodiment, the sensor system 8 can be activated when, for example, a movement is detected on the floor L0, L1, either by an external movement sensor or by the sensor system 8 itself, which system recognizes changes in image recordings as movement and responds thereto.

In a step S5, the sensor system 8 can, for example, evaluate image recordings of the access zone Z3 in order to determine whether a person 4 is in the access zone Z3. Devices and algorithms for evaluating image recordings, for example, in order to recognize, count, and possibly identify persons and/or objects, are known to a person skilled in the art. If this check shows that there is no person 4 there and the situation in front of the sliding door 2*a* is therefore considered secure, the method proceeds along the "no" branch to a step S6.

In the step S6 the object 20 is granted access. For this purpose, the locking device 50 is actuated in order to unlock and open the sliding door 2*a*. As explained above, the opening takes place automatically, without any action required from the object 20. In one embodiment, the sliding door 2*a* is only opened to the extent specified for the object 20 (robot) in the user profile.

If the check in the step S5 shows that a person 4 is in the access zone Z3, this situation in front of the sliding door 2*a* is considered unsecure. The person 4 present could pose a possible risk because they could enter the restricted zone 36 illegally through a sliding door 2*a* open for the object 20.

Since the object 20 is not alone in front of the sliding door 2*a*, the method proceeds along the "yes" branch to a step S7.

In the step S7, an alarm signal is generated. The alarm signal is generated, for example, by the control device 24 when both the sliding door 2*a* for the object 20 having access authorization is to be opened and a person 4 present is detected.

In a step S8, access is disabled by the sliding door system 2. Disabling access takes place in response to the alarm signal received by the sliding door system 2. In one embodiment, the sliding door 2*a* remains locked and closed; this can be the case if the person 4 is detected before the sliding door 2*a* for the object 20 is opened. It can also happen that the person 4 enters the access zone Z3 and is only detected when the sliding door 2*a* has already been unlocked and is more or less open. In one embodiment, the opening can be stopped in this case and the sliding door 2*a* can be blocked against further opening. Disabling access may also comprise closing the sliding door 2*a* from a fully or partially open position. In another embodiment, the sliding door 2*a* can be moved entirely or partially into the closed position; the latter in particular when the object 20 is already located in the passage region 42 and is blocking the path of the sliding door 2*a*. In this case, an alarm can be triggered.

In the access control system 1, a set of rules can be specified which indicates whether and which action should be triggered after such an alarm. These actions can be situation-specific, e.g., depending on what time (day or night) and on what day (working day or weekend, vacation time) the alarm is generated. Examples of actions can include: an audible and/or visually perceptible alarm (siren, warning light); automatically notifying security personnel (police or private security service); and automatically notifying a person responsible for the restricted zone 36 (tenant, owner, building manager, etc.). A person skilled in the art would recognize that these actions can also be combined.

In the embodiment shown, the method proceeds from the step S8 to the step S9 and ends there.

Referring again to the positions of the sliding door 2*a* shown in FIG. 3A-3C, an embodiment of the sliding door system 2 is described below. FIG. 3A-3C are each schematic illustrations of a plan view of the sliding door system 2. Each of these plan views show the components comprised by the sliding door 2*a*: sensor unit 40 (S), processor unit 54 (DC) and locking device 50 (M); for the purpose of illustration, the interface device 48 and the connection thereof to the building management system 22 are not shown. The locking device 50 and the processor unit 54 are arranged inside the sliding door 2*a*, in particular between the door leaves 32. The wall shell region 30 comprising the structure for accommodating the sliding door 2*a* in the open position is also shown in FIG. 3A-3C.

The sensor unit 40 is arranged on the end face. The arrangement is selected such that the electromagnetic radiation (light or radio waves) can propagate unhindered toward the passage region 42 during operation. The sensor unit 40 can, for example, be inserted into a recess in the end face and protected from damage and dirt by a radiation-permeable cover. The sensor unit 40 can also be arranged on the door frame. The electrical connection 58 (FIG. 2) between the sensor unit 40 and the processor unit 54 and the electrical connection 52 (FIG. 2) extend within the sliding door 2*a*, for example, between the door leaves 32.

The illustrated embodiment of the sliding door 2*a* is based on a principle that is similar to a principle known from EP 2876241 A1. Said document describes a sliding door system in which two opposing door surfaces are coupled to an actuator which moves the door surfaces toward or away from one another. In relation to the sliding door system 2 according to the technology described herein, this means that the two door leaves 32 have a leaf spacing d1 when the sliding door 2*a* is in the closed position. In this position, the sliding door 2*a* is locked. During the opening of the sliding door 2*a*, the two door leaves 32 are moved toward one another by means of an actuator 31 (FIG. 3A-3C) until they have a leaf spacing d2 which is dimensioned such that the sliding door 2*a*, when in the fully or partially open position (FIGS. 3B and 3C) thereof, has such a small thickness that it fits into the accommodating structure of the wall shell region 30. The leaf spacing d1 is greater than the leaf spacing d2. In this position, the sliding door 2*a* is unlocked. If the sliding door 2*a* is pushed out of the wall shell region 30, the two door leaves 32 are moved away from one another (spread apart) such that the sliding door 2*a* assumes a specified thickness when in the closed state (FIG. 3A). The thickness is specified in such a way that the outer sides of the two door leaves 32 in the closed position are substantially flush with the outer sides of the wall shell region 30 or the cladding thereof. As a result, a substantially smooth finish is achieved on both wall sides in the door region.

In one embodiment, the sliding door system 2 has a guide device on a door cross member, which guide device supports the sliding door 2*a* and guides it on its path between the closed position and the open position along a track. The sliding door 2*a* has a complementary apparatus on its upper edge. The guide device and the complementary apparatus interact when the locking device 50 causes the sliding door 2*a* to move by means of a drive unit and acts on the complementary apparatus; they can, for example, form a system having a telescopic extension. The drive unit can comprise, for example, a motorized or pneumatic sliding drive which acts on the telescopic extension.

In one embodiment, the two door leaves 32 are moved toward or away from one another by the actuator 31. The actuator 31 can comprise a spreading device which is activated mechanically, electrically, or electromechanically. The spreading device is configured to move the door leaves 32 toward one another when the sliding door 2*a* is to be opened, and to move them away from one another when the sliding door 2*a* is to be closed. A person skilled in the art would recognize that other spreading devices can also be provided instead; for example, cylinders actuated by a pressure medium.

The invention claimed is:

1. A system for controlling access to a building or a restricted zone in the building, the system comprising:

a building door system comprising:

a building door comprising a sliding door arranged to selectively close, by moving from an open position to a closed position, or open, by moving from the closed position to the open position, a passage region within a door frame, wherein a wall shell region is provided to at least partially accommodate the sliding door in the open position, wherein the sliding door has an end face which points towards the passage region in the open position, and wherein the building door is configured to open such that in the open position a distance between the end face and a part of the door frame parallel to the end face is substantially equal to width of an object stored in a storage device, an electronic locking device, and a recognition device that captures credentials for the object, wherein, if the credentials are valid, the building door is unlocked by the electronic locking device and brought from the closed position into the open position in order to grant the object access through the passage region of the building door;

a sensor system that (i) monitors an access zone that comprises a specified access region to the building door, and (ii) detects a person in the access zone; and a control device that is physically coupled to the building door system and the sensor system via a communication network arranged in the building and electrically connected to the storage device and the communication network is configured to communicatively connect the control device, the building door system and the sensor system, wherein the control device generates an alarm signal when the building door system grants the object access and the sensor system detects a person in the access zone, wherein the building door system disables access upon receipt of the alarm signal by blocking of the sliding door in the closed position, and wherein the building door system is further configured to unblock and open the sliding door for passage by the object when the sensor system detects that the person has left the access zone;

wherein height of the object is also stored in the storage device and wherein the building door system further comprises a sensor unit configured to measure a measured height of the object, and wherein the control device generates the alarm signal when the building door system grants the object access and the sensor unit detects the measured height of the object does not match or is not within an acceptable range of the stored height of the object, and wherein the building door system disables access upon receipt of the alarm signal.

2. The system of claim 1, wherein the recognition device is arranged on the building door.

3. The system of claim 2, wherein the locking device and the recognition device are arranged on the building door.

4. The system of claim 1, wherein the recognition device comprises at least one of:

a transceiver for radio signals, a capturing device for a biometric feature, a capturing device for an optical code, a reader for a magnetic stripe card or a chip card, or a keyboard or touch-sensitive screen for manual entry of a password.

5. The system of claim 1, wherein the sensor system comprises a camera and is configured to evaluate an image recorded by the camera in order to detect a person who is in the access zone.

6. The system of claim 5, wherein the camera comprises a 2D camera or a 3D camera.

7. The system of claim 6, wherein the 3D camera comprises a time-of-flight camera.

8. The system of claim 1, wherein the sliding door comprises an actuator that positions door leaves of the sliding door in a first position with a first leaf spacing when the sliding door is in a closed position and in a second position with a second leaf spacing when the sliding door is in an open position, wherein the first leaf spacing is greater than the second leaf spacing.

9. The system of claim 1, further comprising an interface device that is arranged on the building door and is configured to transmit data to or receive data from a building management system.

10. The system of claim 1, wherein the control device is configured to determine a data record in a storage device if the credentials for the object are valid, in which data record the credentials are assigned to an access authorization.

11. A method for operating a system for controlling access to a building or a restricted zone in the building, wherein the system comprises a building door system that includes a building door, an electronic locking device, a recognition device that captures credentials for an object, a sensor system for monitoring an access zone that comprises a specified access region to the building door, a control device that is physically coupled to the building door system and the sensor system via a communication network arranged in the building and the communication network is configured to communicatively connect the control device, the building door system and the sensor system, wherein the building door comprises a sliding door arranged to selectively close, by moving from an open position to a closed position, or open, by moving from the closed position to the open position, a passage region within a door frame, wherein a wall shell region is provided to at least partially accommodate the sliding door in the open position and wherein the sliding door has an end face which points towards the passage region in the open position, the method comprising:

capturing credentials for the object using the recognition device while the object is located in an access zone of the building door, wherein, if the credentials are valid, the building door is unlocked and brought from the closed position into the open position in order to grant the object access at the building door, wherein a distance in the open position between the end face and a part of the door frame parallel to the end face is substantially equal to width of an object stored in a storage device electrically connected to the control device;

detecting, by the sensor system, whether there is a person in the access zone;

generating, by the control device, an alarm signal when the building door system grants access to the object at the building door and the sensor system detects a person in the access zone;

upon receipt of the alarm signal by the building door system, disabling access at the building door using the building door system, wherein disabling access comprises blocking the building door in the closed position; and;

unblocking and opening the sliding door for passage by the object when the sensor system detects the person has left the access zone;

wherein height of the object is also stored in the storage device, and wherein the building door system further comprises a sensor unit configured to measure a measured height of the object, and wherein the method further comprises comparing the measured height to the stored height of the object and generating the alarm signal when the building door system grants the object access and the measured height does not match or is not within an acceptable range of the stored height of the object.

12. The method of claim 11, wherein disabling access comprises blocking the building door in a partially open position.

13. The method of claim 11, wherein disabling access comprises closing the building door from a fully or partially open position, wherein the fully open position is specified for the object.

* * * * *